Dec. 26, 1950     J. E. CADY ET AL     2,535,120
INNER TUBE
Filed Sept. 24, 1947
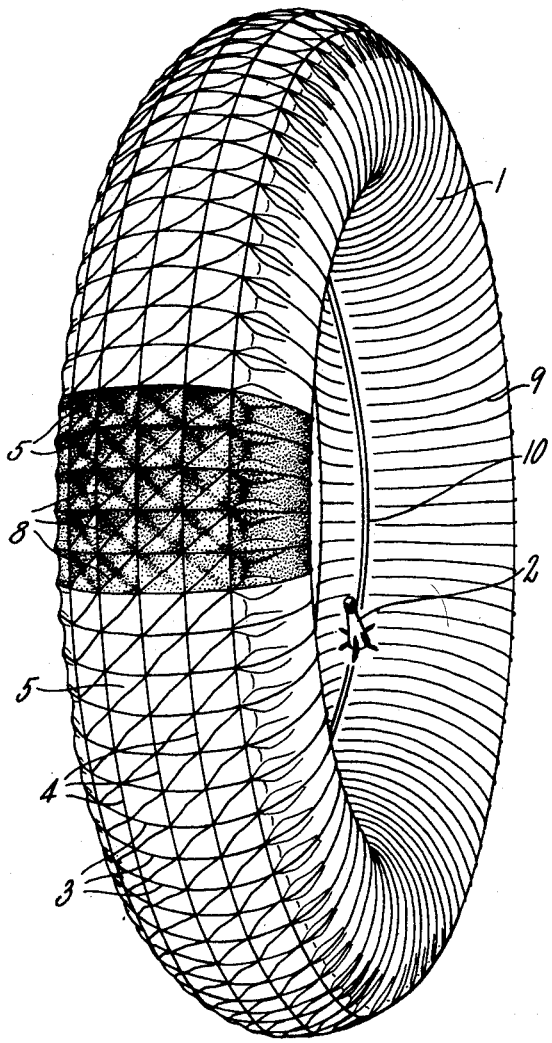
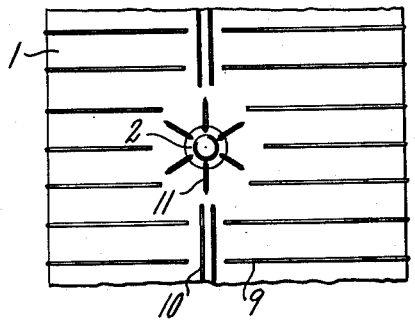
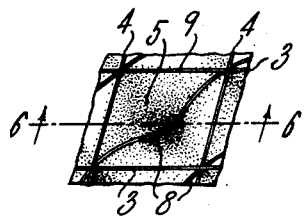
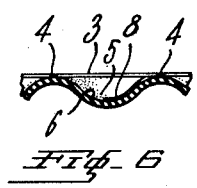
INVENTORS
JOHN E. CADY
FRANCIS A. MULBARGER
BY Henry P. Truesdell
ATTORNEY Patented Dec. 26, 1950

2,535,120

UNITED STATES PATENT OFFICE 2,535,120

INNER TUBE

John E. Cady and Francis A. Mulbarger, Indianapolis, Ind., assignors to United States Rubber Company, New York, N. Y., a corporation of New Jersey Application September 24, 1947, Serial No. 775,822

5 Claims. (Cl. 152—348)

Our invention relates to inner tubes and more particularly to inner tubes of the slow-deflation type for use in pneumatic tire casings.

It is an object of our invention to provide a new and improved inner tube for pneumatic tire casings which, when punctured, and the puncturing object remains in the tube deflates at a rate slower than that of an ordinary inner tube. The construction is such that the tube does not go completely flat suddenly thereby permitting a driver to have the tube serviced before it goes flat.

It is another object of our invention to provide an improved slow-deflation type inner tube in which means is provided to vent or release any air entrapped between the tire casing and the outer surface of the tube.

Still another object of our invention is the provision of an improved slow-deflation inner tube which may be used interchangeably in a tire casing with the plain conventional inner tube and which will not adversely heat or chafe the tire casing in use.

A further object of our invention is to provide an inner tube of the slow-deflation type which is of simple construction capable of being manufactured at low cost on equipment used in the manufacture of conventional inner tubes.

In the accompanying drawing:

Fig. 1 is a perspective view of an inner tube constructed in accordance with our invention;

Fig. 2 is an enlarged detailed view of the construction of the tube adjacent the valve stem;

Fig. 3 illustrates a portion of the tube partially inflated within a tire casing;

Fig. 4 illustrates the tube completely inflated within a tire casing;

Fig. 5 is a detailed perspective view of the tread design of the tubes; and

Fig. 6 is a cross-sectional view through the wall of the tube taken along the line 6—6 of Fig. 5.

Referring to the drawing, an inner tube 1 constructed in accordance with our invention is illustrated in Fig. 1. This tube corresponds to a conventional inner tube insofar as it is constructed of a circular hollow tube of natural or synthetic rubber provided with the usual valve 2 for inflating the tube within a tire casing. However, an added feature not found in a conventional tube is a construction for causing the tube to deflate slowly when punctured, while the puncturing object remains in the tube.

To this end, the tread portion of the tube is provided with a series of parallel waves or corrugations which extend transversely of the tube wall, as indicated at 3, and also longitudinally of the wall, as indicated at 4. The intersecting waves form, in effect, a "waffle" or "grid" surface on the tread portion of the tube. As shown in Figs. 1 and 5, the intersecting waves 3 and 4 form a series of adjacent pockets or depressions 5 which are flattened out when the tube is inflated so that the rubber wall of the tube may be placed in compression. As shown in Fig. 6, the waves extend in an undulating pattern and in configuration they conform to a sine wave ($y = \sin x$) so that there are no sharp peaks or valleys in the wave structure. This means that when the waves are flattened out upon inflation of the tube such compression stresses as are set up in the rubber will extend generally parallel to the rubber stock forming the wall of the tube. Moreover, the rounded configuration of the wave crests assists the waves to flatten out thereby greatly reducing the tendency for the waves to pinch or fold over on inflation.

In actual practice, we have found that a satisfactory slow-deflation type inner tube is obtained if the wave crests are spaced apart from 0.9 to 1.1 inches when the wall of the inner tube is constructed from rubber stock having an average thickness of from 0.085 to 0.095 inch. Within these limits of thickness of the tube wall and spacings of the waves or corrugations, the depth of the depressions between adjacent wave crests, as indicated at 6 in Fig. 6, may vary considerably without adversely affecting the successful operation of the tube. For example, it has been found that the depth of the valley between adjacent wave crests may vary from between 0.190 to 0.300 inch to provide a slow-deflation type tube which operates satisfactorily in service.

The slow deflation inner tube of our invention operates by keeping the rubber in the tube wall unextended upon inflation of the tube to minimize leakage caused by puncturing objects in the tube wall. In Fig. 3, a cross-sectional view through the tread portion of the tube, shows it in position when partially inflated to its normal or mold size within a tire casing 7. It should be noted that the tube expands slightly to an extent such that the crests of the intersecting waves or "waffles" touch the inner wall of the tire casing before the waves or corrugations flatten out. Upon further inflation of the tube up to operating pressure, the waves flatten out, as indicated in Fig. 4. The excess rubber in the tread portion of the tube formed by the "waffles" or waves is thus forced outwardly into the space normally occupied by the inner tube wall so that the rubber is placed slightly in compression rather than in tension such as would be the case if the waffle configurations were not built into the tube wall. It will be apparent that due to tolerances in manufacture of both the tire casing and inner tube, the amount of compression placed in the tube wall upon inflation will vary to some extent. The amount of compression is not critical as long as the rubber is not placed under tension. In fact, we have found that the tube operates satisfactorily if the rubber wall is in a relaxed or normal condition. Thus when a puncturing object remains in the tube wall the lack of tensional stresses in the rubber around the puncturing object reduces the rate of leakage of air to prevent the tube from going flat suddenly.

Another important feature of our invention is the provision of means to vent off any air entrapped between the outer wall of the inner tube and the inner wall of the tire casing and particularly the air caught in the multitude of depressions 5 as the tube is inflated. It is important that such air be vented upon inflation of the tube in a tire casing; otherwise, the air may remain entrapped in small pockets in the tire casing causing premature failure of the casing due to side wall blisters. To this end, we provide a small bead or ridge 8 which extends diagonally across the depression 5 in the waffle configuration of the tube tread. The bead or ridge 8 extends at an angle between the crests of the transverse and longitudinal waves 3 and 4. The crest of each of the waves 3 and 4 itself is provided with a slightly raised bead or ridge 9 and the ridges 9 of the transverse waves extend substantially completely around the outer periphery of the tube wall, as indicated in Fig. 1. The ends of the ridges 9 terminate at points adjacent a series of longitudinal ridges 10 which extend around the inner wall of the tube, as shown in Figs. 1 and 2. The longitudinal ridges 10 themselves terminate at points adjacent the valve 2 which is provided with a series of slots 11 formed in the valve stem, and the adjacent portion of the tube wall. The slots 11 serve to vent the entrapped air to the atmosphere through the valve opening or other openings in the rim on which the tube and tire casing are mounted. The construction of the venting means on the valve stem forms no part of the present invention and is more fully described in Patent 2,014,129 issued to Ernst Eger on September 10, 1935 and assigned to the same assignee as the instant application.

When the inner tube is inflated, the beads or ridges 8, 9 and 10 rest against the inner wall of the casing and necessarily hold the adjacent side walls of the inner tube slightly spaced from the tire casing so that minute passages are formed along the lines of the ridges which conduct any entrapped air along the pathways of the ridges to the valve stem 2 where it is vented to the atmosphere. Since as indicated in Fig. 3 and Fig. 4, the waffle tread part of the tube is the last portion to be inflated against the inner wall of the tire casing, any air entrapped in the small pockets 5 formed by the waves will be forced along the minute passages adjacent the ridge 8 and will then be vented along the pathways provided by the ridges 9 and 10 to the valve stem.

Our slow deflation tube is one which may be made on existing factory equipment used in the manufacture of plain inner tubes inasmuch as the tube rubber stock is of a thickness comparable to that of conventional inner tubes. Moreover, by providing a series of comparatively closely spaced waves extending at angles to each other it is possible to make a tube that conforms to the inner wall of the casing and that is free of tension stresses within the tube wall when inflated. This means that the tube is characterized by having a slow deflation action which is obtained without increasing the thickness of the rubber stock forming the tube wall. The tube will not over-heat in service and will not chafe the inner wall of the tire casing so that the useful life of the tire casing is not impaired. Since the slow deflation action is obtained irrespective of the amount of compressive stresses in the rubber, as long as there are no tensional stresses, the tube is one which will operate properly over its entire life span. In other words, any decrease in the original compressive stresses built into the tube caused by normal use of the tube, will not adversely affect its slow deflation properties.

Having thus described our invention, what we claim and desire to protect by Letters Patent is:

1. A circular hollow inner tube having a valve, said tube being adapted to inflate a pneumatic tire casing, a portion of the wall of the tube having a series of intersecting transverse and longitudinal waves forming a gridwork of transversely and longitudinally spaced isolated depressions covering said portion of said tube wall which flatten out upon inflation of the tube, ridges formed along the crests of said waves for venting air, additional ridges formed in the walls of said depressions for venting air from the depressions upon inflation of the inner tube, the ridges formed along the crests of the transverse waves extending around the outer periphery of the tube wall and means formed in the tube wall for feeding the vented air from the transverse ridges to the exterior of the tire casing.

2. A circular hollow inner tube having a valve, said tube being adapted to inflate a pneumatic tire casing, a portion of the wall of the tube having a series of intersecting transverse and longitudinal waves forming a gridwork of transversely and longitudinally spaced isolated depressions covering said portion of said tube wall which flatten out upon inflation of the tube, ridges formed along the crests of said waves for venting air, additional ridges extending diagonally across the walls of said depressions for venting air from the depressions upon inflation of the inner tube, the ridges formed along the crests of the transverse waves extending around the outer periphery of the tube wall and means formed in the tube wall and valve for feeding the vented air from the transverse ridges to the exterior of the tire casing.

3. A circular hollow inner tube having a valve, said tube being adapted to inflate a pneumatic tire casing, a portion of the wall of the tube having a series of intersecting waves forming a gridwork of isolated depressions covering said portion of said tube wall which flatten out upon inflation of the tube, the crests of said waves being formed with ridges for venting air from the tire casing and additional ridges formed in the walls of said depressions for venting air from the depressions upon inflation of the inner tube, certain of the ridges formed along the crests of the waves extending around the outer periphery of the tube wall and means formed in the tube wall for venting the air from said last mentioned ridges to the exterior of the tire casing.

4. A circular hollow inner tube for inflating a pneumatic tire casing, a portion of the wall of the tube having a series of intersecting transverse and longitudinal waves forming a gridwork of transversely and longitudinally spaced isolated depressions covering said portion of said tube wall which flatten out upon inflation of the tube, ridges formed along the crests of said waves for venting air, additional ridges formed in the walls of said depressions for venting air from the depressions upon inflation of the inner tube, and means formed in the tube wall for conducting the vented air to the exterior of the tire casing.

5. A circular hollow inner tube for inflating a pneumatic tire casing, a portion of the wall of the tube having a series of intersecting waves forming a gridwork of isolated depressions covering said portion of said tube wall which flatten out upon inflation of the tube, ridges formed along the crests of said waves for venting air, additional ridges formed in the walls of said depressions for venting air from the depressions upon inflation of the inner tube, and means formed in the tube wall for conducting the vented air to the exterior of the tire casing.

JOHN E. CADY.
FRANCIS A. MULBARGER.

REFERENCES CITED

The following references are of record in the file of this patent:

UNITED STATES PATENTS

| Number | Name | Date |
|---|---|---|
| 1,192,238 | Spratling | July 25, 1916 |
| 2,041,534 | Eger | May 19, 1936 |
| 2,325,354 | Wyman | July 27, 1943 |
| 2,339,548 | Wilson | Jan. 18, 1944 |